United States Patent Office 3,786,099
Patented Jan. 15, 1974

3,786,099
PROCESS FOR THE PREPARATION OF CYCLODECANONE
Frederick Harold Howell, Maghull, near Liverpool, England, assignor to J. R. Geigy A.G., Basel, Switzerland
No Drawing. Filed Nov. 20, 1967, Ser. No. 684,526
Int. Cl. C07c 49/27
U.S. Cl. 260—586 A                                 1 Claim

ABSTRACT OF THE DISCLOSURE

Cyclodecanone is produced by catalytic hydrogenation of 6-hydroxy cyclodecanone, and is converted to sebacic acid. The latter can also be produced by oxidation of mixtures of cyclodecanone and cyclodecanol, or cyclodecanol alone. Inducement and control of exothermic reaction during the conversion to sebacic acid are described.

DESCRIPTION OF THE INVENTION

The present invention relates to the production of cyclodecanone as an intermediate which may be converted to sebacic acid and a process of converting the said intermediate to sebacic acid.

A process of reducing cyclodec-5-enone to cyclodecanone followed by reduction of the cyclodecanone to cyclodecanol has already been described by A. C. Cope and G. Holzmann, Journal of the American Chemical Society, volume 72, page 3062, 1950. These workers used hydrogen in the presence of palladium catalyst and methanol solvent for the conversion of cyclodec-5-enone to cyclodecanone and hydrogen in the presence of Adams' catalyst in acetic acid solvent for the reduction of cyclodecanone to cyclodecanol. The yield of pure cyclodecanol obtained by this method was not disclosed but is evidently rather poor.

The cyclodec-5-enone starting-material for this known process is conventionally obtained by dehydration of 6-hydroxycyclodecanone according to various methods. Thus Cope and Holzmann prepared cyclodec-5-enone by reacting the 6-hydroxy grouping with p-toluene sulphonyl chloride and splitting off the sulphonate grouping so formed by heating with diethylaniline at an elevated temperature. Alternatively, it is known to prepare the cyclodec - 5 - enone starting-material by dehydration of 6-hydroxycyclodecanone or a carboxylic acid ester thereof by heating in the presence of a metal catalyst as described in British patent specification No. 979,889.

In view of this trend in the art, it has now been surprisingly found that carboxylic acid esters of 6-hydroxycyclodecanone can be converted directly to cyclodecanone by hydrogenolysis in good yield, thus omitting one of the reaction steps which were previously necessary.

The aforesaid carboxylic acid esters are preferably lower alkanoates or benzoates.

According to the present invention, there is provided a process of producing cyclodecanone comprising reacting a carboxylic acid ester of 6-hydroxycyclodecanone with hydrogen in the presence of a Raney nickel catalyst at a temperature of at least 200° C.

The process of this invention is conveniently carried out in a pressure reactor and at a temperature which is preferably within the range of from 200° to 250° C. After placing the ester starting-material and catalyst into the reactor, flushing of the reactor with an inert gas such as nitrogen is desirable. The contents of the reactor may then be heated to the desired reaction temperature and a pre-determined amount of hydrogen, preferably of at least one molar proportion per mole of ester starting-material, admitted. On completion of the hydrogenolysis, the contents of the reactor may be removed after cooling by any conventional method, for instance by washing out the reactor with a suitable solvent. After filtration and washing of the solvent extract the desired cyclodecanone produced may be isolated, for instance by fractional distillation.

The present invention further provides as a second aspect a process of producing sebacic acid comprising oxidizing cyclodecanone or cyclodecanol or mixtures thereof with nitric acid of concentration greater than 60% weight/weight at an elevated temperature.

If cyclodecanol or a mixture of cyclodecanol and cyclodecanone containing predominantly cyclodecanol is oxidized by the process of the invention, the oxidation is conveniently effected at a temperature of about 60° C. for instance a temperature within the range of from 60° to 70° C. By adding cyclodecanol or a mixture containing predominantly cyclodecanol in small portions to the nitric acid solution, the exothermic oxidation reaction can be easily controlled. It is generally advantageous to control the amount of cyclodecanol or mixture containing predominantly cyclodecanol added in each portion to the nitric acid solution so that a temperature rise of not more than 5° C. is produced; in this way optimum yields of sebacic acid are obtained.

However, if cyclodecanone or a mixture of cyclodecanone and cyclodecanol consisting of predominantly cyclodecanone is oxidized, the oxidation is advantageously conducted at a higher temperature, preferably a temperature of about 80° C., for instance a temperature within the range of from 80° to 90° C., in order that an exothermic reaction may be induced; little or no exothermic reaction being observed below this temperature.

By adding cyclodecanone or mixtures containing predominantly cyclodecanone in small portions to the nitric acid solution, the exothermic oxidation reaction can easily be controlled. It is generally advantageous to control the amount of cyclodecanone or mixture containing predominantly cyclodecanone added in each portion to the nitric acid solution so that a temperature rise of not more than 5° C. is produced; in this way optimum yields of sebacic acid are achieved.

During the oxidation process of this invention it is preferred that a minor proportion of ammonium vanadate and a trace of copper powder are present.

The oxidation reactions are preferably effected until no further exothermic effect is observed after which the oxidation may be advantageously completed by heating the reaction mixture for a short period at an elevated temperature, for example a temperature of approximately 100° C.

The sebacic acid product may be isolated by cooling the reaction mixture, preferably with stirring, whereupon the solid product crystallizes from solution. The sebacic acid product may be further purified, if desired, by conventional means, for instance by fractional crystallization from a suitable solvent.

The cyclodecanol starting-material for the oxidation process of this invention may be obtained from the hydrogenolysis process according to this invention. Alternatively, cyclodecanone may be prepared by the hydrogenation of cyclodec-5-enone as described by Cope and Holzmann.

The cyclodecanol starting-material for the oxidation process of the present invention is preferably produced by hydrogenation of cyclodec-5-enone using Raney nickel catalyst; however, the hydrogenation of cyclodec-5-enone to cyclodecanol may be effected according to the procedure of Cope and Holzmann if desired.

The sebacic acid produced by the process according to the second aspect of this invention is an important industrial compound, especially in the forms of its dialkyl esters. These esters find wide application both in the field of polyvinyl chloride plasticization and also as synthetic lubricants for modern turbo-jet aircraft engines.

The invention is further illustrated by the following examples. Parts and percentages therein the expressed by weight unless otherwise stated. Parts by weight bear the same relation to parts by volume as do kilograms to litres.

EXAMPLES 1 TO 3

21.2 parts of 6-acetoxy cyclodecanone (0.1 mole) and 2.0 parts of Raney nickel catalyst were placed in a stainless-steel, rocking pressure reactor of 100 parts by volume capacity. The pressure reactor was purged with nitrogen and then heated to 200° C. 0.2 part of hydrogen gas (0.1 mole) were admitted to the reactor at 200° C., and rocking of the reactor was commenced and continued for 2 hours at 200° C. The reactor was allowed to cool to 25° C., and the reaction mixture was extracted from the reactor with ether solvent. After filtration of the ether extract in order to remove the catalyst, the filtrate was washed with dilute aqueous potassium hydroxide and water. The ether solvent was removed by evaporation and the residue was distilled under reduced pressure to give 12.8 parts of a fraction boiling in the range of from 80° C. to 140° C. (mainly at 110° to 120° C.) at 12 millimetres of mercury pressure, and 1.4 parts of a still residue. Gas/liquid chromatographical (G.L.C.) analysis of the main fraction showed it to contain:

| Compound: | Percent composition |
|---|---|
| Cyclodecane | 17.9 |
| 1,6-oxidocyclodecane | 3.7 |
| Cyclodecanone | 71.0 |
| Cyclodecanol | 3.2 |
| Unknowns | 4.1 |

The total yield of cyclodecanone plus cyclodecanol was 62%.

The results of this experiment and various closely-related experiments using Raney nickel catalyst are shown in the following Table 1. Table 1 also includes, for comparative purposes only, data relating to the use of a palladium catalyst and further data relating to the use of a reaction temperature of 150° C. and therefore outside the scope of this invention.

Similar satisfactory results are obtained when repeating the above procedure but using in lieu of 21.2 parts of 6-acetoxy-cyclodecanone an equivalent amount of 6-benzoyloxy-cyclododecanone.

placed together with 2.0 parts of freshly-prepared Raney nickel catalyst in a stainless steel, rocking pressure reactor of 100 parts by volume capacity. The reactor was purged with nitrogen and then pressurized to 100 atmospheres with gaseous hydrogen. After rocking at 25° C. for a period of two hours the pressure in the reactor gradually fell and finally remained steady at 67 atmospheres. The internal temperature of the reactor was raised to 110° C. and held at this temperature for three hours. After allowing the reactor to cool to 25° C., the reaction mixture was extracted from the reactor with ether solvent. The ether extract was filtered and the filtrate after removal of the solvent by evaporation left 12.5 parts of an oil. This oil was shown by gas/liquid chromatography to contain 76.4% of cyclodecanol. The crude cyclodecanol was then purified by isolating the p-nitrobenzoate ester and by hydrolyzing this ester back to cyclodecanol.

Example 4(B)—Production of sebacic acid

To 46 parts of 70% nitric acid containing 0.1 part of ammonium vanadate and a trace of copper powder and maintained at 60° C., there were added 5.0 parts of pure cyclodecanol in small portions, with stirring. The rate of addition of cyclodecanol was controlled so that each addition did not produce an exothermic temperature rise of greater than 5° C. After each addition, the reaction temperature was allowed to return to 60° C. before making the next addition. The total addition period was 55 minutes.

After the addition of cyclodecanol was complete, the reaction temperature was raised to 100° C. for a period of 5 minutes. While maintaining the stirring, the reaction mixture was allowed to cool to 70° C., during which process crystallization of sebacic acid commenced, and was finally cooled to 0° C. and allowed to stand at this temperature.

The white solid which crystallized from the reaction mixture was then filtered, washed with water and oven-dried to produce 5.4 parts of a product having melting-point of 129° to 131° C. and an acid value of 537 milligrams of potassium hydroxide per gram (sebacic acid requires an acid value of 554). Gas/liquid chromatographical analysis showed the product to consist of 98.4% of sebacic acid and 1.6% of azelaic acid. The yield of sebacic acid was 83% theoretical.

TABLE I

| Example | Catalyst | Reaction temperature, °C. | Molar proportion of hydrogen per mole of 6-acetoxy cyclodecanone | G.L.C. analysis of product, percent composition | | | | | Yield of cyclodecanol plus cyclodecanone, percent |
|---|---|---|---|---|---|---|---|---|---|
| | | | | 1 | 2 | 3 | 4 | 5 | |
| | Raney nickel | 150 | 2.9 | No hydrogenolysis | | | | | |
| 1 | do | 200 | 1.0 | 71 | 3 | 4 | 18 | 4 | 62 |
| 2 | do | 200 | 3.2 | 69 | 7 | 7 | 16 | 1 | 59 |
| 3 | do | 290 | 3.4 | 47 | | 18 | 22 | 13 | 33 |
| | Palladium | 200 | Excess | 1 | | 14 | 83 | 2 | 1 |

NOTE.—Key to numbers used in G.L.C. data in Table I is as follows: 1=cyclodecanone; 2=cyclodecanol; 3=1,6-oxido-cyclodecanone; 4=cyclodecane; 5=unknowns.

EXAMPLES 4 TO 8

Example 4(A)—Preparation of cyclodecanol 12.4 parts of cyclodec-5-enone having a purity of 77.1% were dissolved in 10 parts by volume of methanol and The results obtained on this and similar experiments using 70% nitric acid are summarized in the following Table II which, for the purposes of comparison only, also contains data relating to experiments using nitric acid of concentrations outside the scope of this invention.

TABLE II

| Example | Percent HNO₃ | Cyclodecanol addition temperature | Reaction conditions after cyclodecanol addition | Percent yield of sebacic acid | Acid value | Melting point of product, °C. | G.L.C. analysis product, percent | |
|---|---|---|---|---|---|---|---|---|
| | | | | | | | Sebacic acid | Azelaic acid |
| 4 | 40 | 75 | Temperatures raised to 100° C. over 5 minutes and held at this temperature for 15 minutes. | 39 | 538 | 127–131 | | |
| | 50 | 75 | | 48 | 549 | 115–225 | | |
| | 70 | 75 | | 72 | 543 | 131–132 | | |
| 5 | 70 | 60 | | 77 | 554 | 131–133 | 97.8 | 1.4 |
| 6 | 70 | 60 | | 83 | 537 | 129–131 | 98.4 | 1.6 |
| 7 | 70 | 60 | Temperature raised to 100° C. over 5 minutes | 82 | 549 | 130–132 | 98.3 | 1.7 |
| | 60 | 60–65 | Temperature raised to 100° C. over 5 minutes and held for 5 minutes. | 62 | 526 | 122–132 | | |
| 8 | 70 | 60–65 | | 83 | 551 | 129–131 | 98.4 | 1.6 |

EXAMPLE 9

5.0 parts of pure cyclodecanone were added dropwise at 85° C. to 46 parts of a stirred 70% nitric acid solution containing 0.1 part of ammonium vanadate and a trace of copper powder. The rate of addition of cyclodecanone was controlled so that the reaction temperature could be maintained within the range of from 85° to 90° C. with external heating. When the addition of cyclodecanone was complete, the reaction temperature was quickly raised to 100° C. and held at this temperature for 5 minutes.

The reaction mixture was then cooled to 0° C. and allowed to stand at this temperature. After a short time, the white crystalline solid which separated from the reaction mixture was then filtered. The solid so obtained was washed with a little cold water and oven-dried to give 5.1 parts of a product having melting-point 132 to 134° C. and an acid value of 550 milligrams of potassium hydroxide per gram.

Gas/liquid chromatographical analysis of the product showed it to contain 98.1% of sebacic acid, representing a yield of sebacic acid of 78% theoretical.

What is claimed is:

1. A process for producing cyclodecanone comprising reacting a lower alkanoate or the benzoate of 6-hydroxycyclodecanone with hydrogen at elevated pressure and at a temperature of 200°–250° C. in the presence of Raney nickel.

References Cited

Criegee, "Berichte" 1944, pp. 722–726.

Kalechits et al., "Chem. Abstracts," vol. 55, 18658b [1960].

Shuikin et al. "Chem. Abstracts," vol. 56, 1335e, [1961].

LEON ZITVER, Primary Examiner

N. MORGENSTERN, Assistant Examiner

U.S. Cl. X.R.

260—476 R, 488 R, 531 R, 537 P, 617 M

UNITED STATES PATENT OFFICE
CERTIFICATE OF CORRECTION

Patent No. 3,786,099　　　　　　　　　Dated January 15, 1974

Inventor(s) FREDERICK HAROLD HOWELL

It is certified that error appears in the above-identified patent and that said Letters Patent are hereby corrected as shown below:

In the heading of the patent, column 1, change the name of the Assignee from "J. R. GEIGY A.G." to --CIBA-GEIGY A.G.--.

Signed and Sealed this thirteenth Day of April 1976

[SEAL]

Attest:

RUTH C. MASON
*Attesting Officer*

C. MARSHALL DANN
*Commissioner of Patents and Trademarks*